(12) United States Patent
Mundheim

(10) Patent No.: US 9,315,394 B2
(45) Date of Patent: Apr. 19, 2016

(54) METHOD AND APPARATUS FOR SEPARATION OF MULTIPHASE FLUIDS, AND APPLICATIONS THEREOF

(75) Inventor: Atle Mundheim, Omastrand (NO)

(73) Assignee: SORBWATER TECHNOLOGY AS, Bergen (NO)

( * ) Notice: Subject to any disclaimer, the term of this patent is extended or adjusted under 35 U.S.C. 154(b) by 990 days.

(21) Appl. No.: 12/865,423

(22) PCT Filed: Feb. 2, 2009

(86) PCT No.: PCT/NO2009/000038
§ 371 (c)(1),
(2), (4) Date: Jul. 30, 2010

(87) PCT Pub. No.: WO2009/099336
PCT Pub. Date: Aug. 13, 2009

(65) Prior Publication Data
US 2010/0320154 A1    Dec. 23, 2010

(30) Foreign Application Priority Data

Jan. 31, 2008 (NO) .................................. 20080593

(51) Int. Cl.
*C02F 1/24* (2006.01)
*B01D 17/035* (2006.01)
*B01D 17/038* (2006.01)
*B03D 1/24* (2006.01)
*B01D 19/00* (2006.01)
*C02F 1/38* (2006.01)
*B01D 17/02* (2006.01)
(Continued)

(52) U.S. Cl.
CPC .............. *C02F 1/24* (2013.01); *B01D 17/0217*
(2013.01); *B01D 19/0057* (2013.01); *B03D 1/1418* (2013.01); *B03D 1/247* (2013.01); *C02F 1/38* (2013.01); *B01D 17/0205* (2013.01); *B03D 1/1456* (2013.01); *B03D 1/1493* (2013.01); *B03D 1/24* (2013.01); *C02F 2101/32* (2013.01)

(58) Field of Classification Search
USPC .................... 210/703, 787, 788, 221.2, 512.1
See application file for complete search history.

(56) References Cited

U.S. PATENT DOCUMENTS 2,364,799 A * 12/1944 Laughlin et al. ........... 210/512.1
2,706,045 A *  4/1955 Large ............................ 209/732
(Continued)

FOREIGN PATENT DOCUMENTS

CA      2120436    * 10/1994
EP      0716869      6/1996
(Continued)

*Primary Examiner* — Thomas M Lithgow
(74) *Attorney, Agent, or Firm* — Ladas & Parry LLP

(57) ABSTRACT

A method for pre-separation of multi phase fluids of liquid-liquid phase and/or liquid-gas phases and/or gas-liquid phases, is disclosed, wherein one or more of the phases is suspended in water with bubble /drop/particle sizes in the sub micron and micron area and/or fine particular organic or inorganic matter is present in one or more of the phases, and where the device is placed in or in connection to a cyclone or flotation tank. The method is characterized by the fluid phases being made to flow through a tube which forms a spiral shape, in order to bring about an initial phase separation (coalescence) in the spiral shape, and the phases being led continuously tangentially out of the spiral shape in a cyclone—or flotation chamber wherein the further separation is generated. An apparatus to accomplish the method and applications thereof are also disclosed.

18 Claims, 4 Drawing Sheets

Figure 1:
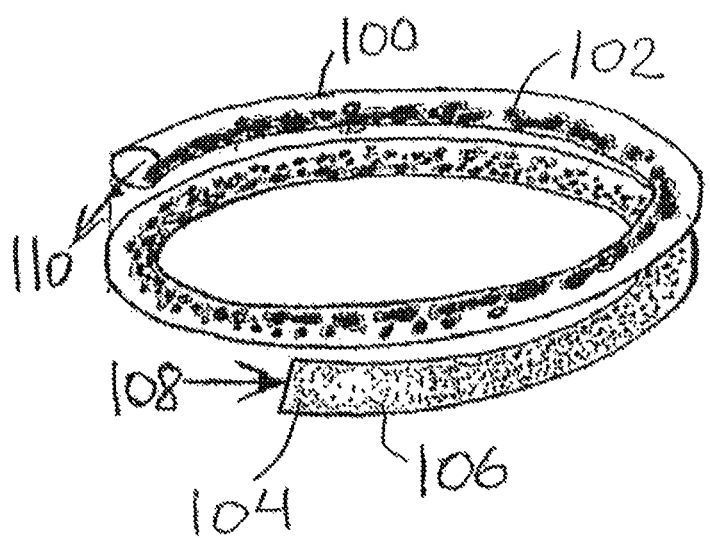

(51) Int. Cl.
*B03D 1/14* (2006.01)
*C02F 101/32* (2006.01)

(56) References Cited

U.S. PATENT DOCUMENTS

| | | | | |
|---|---|---|---|---|
| 2,796,808 | A | * | 6/1957 | Baliol ............................ 209/734 |
| 4,031,006 | A | | 6/1977 | Ramirez |
| 4,997,549 | A | | 3/1991 | Atwood |
| 5,004,552 | A | | 4/1991 | Al-Yazdi |
| 5,120,436 | A | * | 6/1992 | Reichner ........................ 210/207 |
| 5,403,473 | A | * | 4/1995 | Moorehead et al. ............ 210/95 |
| 5,543,043 | A | | 8/1996 | Bates |
| 5,770,050 | A | * | 6/1998 | Trefz et al. ..................... 209/170 |
| 6,332,980 | B1 | * | 12/2001 | Moorehead .................... 210/104 |

FOREIGN PATENT DOCUMENTS

| | | | |
|---|---|---|---|
| JP | 07194902 | | 1/1995 |
| JP | 07-124549 A | * | 5/1995 |
| JP | 07-194902 A | * | 8/1995 |
| WO | WO 2007/144631 A2 | * | 12/2007 |

* cited by examiner

METHOD AND APPARATUS FOR SEPARATION OF MULTIPHASE FLUIDS, AND APPLICATIONS THEREOF

The present invention relates to a method and an apparatus for pre-separation of multi phase fluid of liquid-liquid phase and/or liquid-gas phases and/or gas-liquid phases where one or more of the phases is suspended in water with bubble/drop/particle sizes in the sub micron and micron area and/or fine particular organic or inorganic matter is present in one or more of the phases, and there the device is placed in or in connection to a cyclone or flotation tank.

The invention also relates to uses of the apparatus.

More specifically the invention relates to an integrated device for the gathering of small drops and thereby the increasing of drop size of liquids with varying net weight in multiphase streams, and in the same manner gathering small gas bubbles and thereby increasing the size of gas bubbles in gas-liquid or liquid-gas streams.

The invention also relates to processes of injecting air/gas in micro bubble size or as air/gas pressure saturated liquid, or as a combination of the aforementioned, in order to hook air gas to pollution in the liquid stream, where the method described pre-separates added micro bubbles with attached pollution in or in front of flotation and cyclone processes that handles a continuous liquid stream.

The invention also relates to the use of the device integrated in, or in front of, ordinary cyclone or flotation processes, or combinations of these, as is evident from the following dependent and independent claims.

The invention deals with the technology that has to do with separating multiphase streams where the different phases have different weight. In particular it deals with separating oil, water and gas from produced water from the oil industry, but it also deals with separating organic and inorganic pollution from general effluent water and drinking water in the same way.

The invention also deals with the coalescing of small liquid drops of the same phase in a multiphase liquid-liquid stream into large drops of the same phase.

The invention also deals with the coalescing of micron and submicron gas bubbles in a liquid phase into larger gas bubbles, and where these as submicron and micro bubbles have attached to particles and/or hydrophobic and/or oleophillic pollution in the liquid phase.

With the term "micron"-level bubble and particles in a size range of equal to or above 1 micron, i.e. above 1 µm, in particular in the range of 1-1000 µm, while the term "submicron"—level means bubbles and particles where the particle size is below 1 µm.

Known Methods that are Used Today.

Today a number of different hydro cyclones exist for separation of components with different specific weights. The most common denominator is that multiphase liquid is processed tangentially into the cyclone's circular chamber, where a centered open cylinder contributes to a high rotation speed on the multiphase liquid, so that the centrifugal force separates particles or liquid with the highest specific density to the outer wall of the chamber, while lighter liquid/gas is pulled into the cylinder in the centre.

A vortex is formed under the cylinder where the phase with low weight accumulates and is pulled up into the cylinder, and the heavier phase follows the outer wall and is processed out into the outlet at the bottom of the cyclone. The light phase which gathers in a vortex under the centered cylinder will rise inside the cylinder and be discharged as reject if this phase is to be separated. If for instance particles or liquid of net weight larger than what you are keeping is contamination, the reject will stay in the bottom outlet of the cyclone and a clean phase will rise in the centered cylinder in the inlet chamber of the cyclone.

The suitability of separation in multiphase streams as a result of difference in net weight, $\Delta SG$ (Delta Specific Gravity), under the influence of centrifugal force is known for being approximately logarithmic[ally] proportional with the drop size of one of the different phases that are being separated. The smaller the $\Delta SG$, the larger the drop size necessary for equally efficient separation.

In the opposite case, when the different phases in a stream have a large $\Delta SG$, smaller particles/drops may be separated with the same centrifugal force.

For flotation, therefore, submicron air/gas bubbles are desired for tacking these onto pollution in liquid, so that the pollution can reach a low net weight. It is known that by saturating air/gas in liquid (water) under pressure, oxygen/gas will with relief of pressure expand as oxygen/gas bubbles of submicron size. This can also be achieved using multiphase pumps with 4-8 bar pressure on the pressure side and an injection of gas/air on the suction side of the pump. It is also known that these pumps crush air to about 30 micron bubble size, and the combination of pressure and crushing results in so-called white water with submicron gas bubbles saturated in liquid which with relief of pressure typically expand to gas bubbles of a size of 1-5 micron.

It is known that for the efficient separation in a flotation cyclone where gas bubbles are attached to pollution in order to achieve difference in net weight is dependent on bubble size. A larger number of smaller bubbles have a bigger chance of hitting pollution and subsequently attaching to it. Small bubbles are slower to separate and have a bigger chance of hitting pollution if the process provides enough time for this.

It is known that a gas bubble can be bound to a drop of oil by adhesion, with relatively weak binding to the oil drop, or if the oil drop envelops the gas bubble, this binding being significantly stronger.

It is known that adhesion is the most prominent of the known flotation processes, and that gas bubbles will then remove oil drops of its own size or larger.

It is also well known that the usage of micro bubble flotation in known flotation techniques means that you need an about 3 times as long time in the flotation tank for the bubbles attached to pollution to have the time to rise to the skimmer/separation area. It is also known that with 30-200 micron bubble size on air/gas you need a tank with a surface of 10 m$^2$ and a height of more than 2.6 m pr 100 m$^3$/t processed water in regular flotation techniques. This so that a short circuit stream of air/gas/pollution will not be dragged out on the clean water side at the bottom of the flotation tank.

It is also known that there exists so-called hybrid solutions where a flotation, cyclone, air/gas stripping principle is combined in one unit. These units have a typical flow speed of optimally 40 seconds. Water is tangentially brought into a cylindrical tank. An inner cylinder, covering ⅓ of the total height in the cylindrical tank, equivalent to the vortex breaker cylinder in a standard cyclone, is typically placed in the centre to increase the rotation speed on liquid. The speed is then broken under the cylinder and a vortex is created under the inner cylinder.

Polluted materials with gas rise in the inner cylinder and is carried away, and clean water is carried out at the bottom of the cylinder tank. This is described in the patent applications U.S. Pat. No. 6,749,757 B2, and WO 2005/079946 A1.

Typical hydro cyclones have in general a tangential inlet and two outlets, one is for the concentrated heavier fraction (under-flow) and one for the relatively clean liquid that flows out of what is called the Vortex Finder Tube (overflow). Hydro cyclones undertake separation on the basis of density and convert pressure energy into momentum of rotation generates the centrifugal force which generates the separation of heavier materials. The separation effect is decided by the geometric parameters of the hydro cyclone. The interaction between the parameters decides the hydro cyclone efficiency. It is essential that the geometry of each internal component is designed to promote a smooth transition in maintaining laminar flows.

It is also known that desalinating of oil can be carried out by mixing in a few percent fresh water in the oil, whereby this is separated out with the salts. One way of doing this is described in U.S. Pat. No. 537,695 where water in oil is separated by leading the phases through the spiral coiled tube so that the centrifugal forces pull the water to the outer diameter of the tube, and the oil is pulled toward the inner diameter of the tube, so that the small tangential outlet in the spiral separate water/salt from oil. A similar equivalent separator for coalescing water from oil is described in U.S. Pat. No. 7,314,559 B2.

The oil and gas industry produces large amounts of waste water that needs cleaning. The discharges happens when 30-80% water is mixed with oil/gas from the reservoirs. Water/oil/gas is separated on the fields and the water fraction which is not injected into the reservoir, is released to the recipient after passing through different cleaning processes to reduce the content of hydrocarbon. Two water streams are typical for one field. "Clean water stream" from a pressurized separator is typically at a volume of 10.000-100.000 m$^3$ water per day depending on the size of the field. This first separator step can bring the oil content down to 10-40 mg/l. The drop size of the remaining oil fraction which today's technology does not catch is typically the portion below 5-10 micron.

In the second and third separator step in oil/gas/water separation is typically generated from 1.000-5.000 m$^3$ of polluted water/day on an offshore field. This water, which is called "Dirty water stream", will typically have an oil content varying from 100-1500 mg/l. This is typically cleaned by flotation or coalescence filters and flotation. Known technologies do not extract oil drops smaller than 5-10 micron, and the discharge consequently varies from 10-40 mg oil hydrocarbon/l.

Reference is also made to the teaching of U.S. Pat. No. 4,031,006, EP-patent specification 716,869, and JP patent specification 07 194902. Compared to he first mentioned US-patent, the present invention differs form the US-proposals, as disclosed in the following, that the US-patent does not disclose any vortex-finder including a helical pipe circuit, which is an essential feature of the present invention.
Known technologies used from cleaning comprise the following:
  Cyclones where oil is mechanically separated from water.
  Combined feed of condensate to upgrade oil drop size with subsequent separation in cyclone.
  Flotation cells where oil is flocculated out by gas flotation (very light hydrocarbons or nitrogen as flotation medium).
  Combined flotation/cyclone/gas stripping where flotation takes place in a vertical cylindrical tank with a tangential liquid feed.
  Coalescing of oil drops in liquid stream using mediums or plates inserted in liquid stream.
  Adsorption in prepared media filters.
In all known processes, flocculants or extraction agents may be used to increase the effects of the processes.

Today's methods are limited in that they are not useful for the treatment of the large volumes of waste water generated, when it comes to removing oil drops smaller than 5-10 microns. This is one of the main reasons why the average effluent of oil in produced water from the oil and gas industry today is about 22 mg/l in the North Sea.

It is an object of the invention to produce a new and improved device, placed in a continuous stream of process water in or in front of a multiphase separator, cyclone or flotation tank, which by mixing in micro bubble gas or gas saturated liquid enables the separation of oil/water/particles/gas with a drop/particle/bubble size of also less than 5-10 micron without such micro bubble gas infusion resulting in a need for an increase of time spent in the separation chamber for efficient separation.

It is furthermore an object of the invention to produce a new and improved way of separating oil hydrocarbon from water, particularly oil drops smaller than 5-10 micron, in a compact flotation cyclone by infusing the process water stream with gas saturated liquid and micro bubble gas in front of the device.

It is furthermore an aim of the invention to produce a new and improved method for separating oil from water in accordance with the aforementioned aim by also combining the usage of the device where in process water is processed with gas to saturated water and micro bubble gas alone, or where a flocculent and/or a finely dispersed extraction agent is also dosed to increase the degree of purification.

It is furthermore an object of the invention to produce a new and improved method for separation of other organic and inorganic pollution in a continuous liquid stream in accordance with the aforementioned aim by also combining the usage of the device where in process water is processed with gas saturated water and micro bubble gas alone, or where a flocculent and/or a finely dispersed extraction agent is also dosed to increase the degree of purification.

It is an aim of the invention to produce uses/devices for the separation of organic and/or inorganic pollution in a continuous liquid stream.

The method according to the invention is characterized in that the fluid phases being made to flow through a tube which forms a spiral shape, in order to bring about an initial phase separation (coalescence) in the spiral shape, and the phases being led continuously tangentially out of the spiral shape in a cyclone- or flotation chamber wherein the further separation is generated.

The apparatus of the invention is characterised by a tube which forms, a spiral shape and through which the fluid phases stream in order to bring about a preliminary separation (coalescence), which tube comprises an inlet and an outlet for the multiphase fluid, as the outlet is placed tangentially in a cyclone- or flotation chamber wherein the additional separation is generated.

According to a preferred use the apparatus is an independent vortex finder in a cyclone or a flotation cyclone tank. According to another variant, the apparatus is a vortex finder arranged in combination, in line with, a initial vortex finder in a cyclone or a flotation cyclone tank.

According to the present invention a device is thereby produced which makes it possible to separate oil hydrocarbons from water where an addition of micro bubble gas or gas saturated water in a continuous liquid stream can be added by forceful mixing without this resulting in the small bubbles and oil drops needing to stay longer in a cyclone or a flotation cyclone to be able to be separated with oil hydro carbon.

Furthermore a device is achieved enabling separation of oil drops smaller than 5-10 micron from process water, where gas pressure saturated water is vigorously mixed into a polluted liquid stream, so that oil drops smaller than 5-10 micron envelop gas bubbles of a smaller size so that the difference in net weight of oil/gas drops and water is much greater than between water and oil drop of the same size without the oil drop enveloping gas.

With the term "micron"-level bubble- and particle sizes in a range of 1-1000 μm, while the term "sub-micron"-level means bubbles and particle sizes below 1 μm.

Furthermore, a device has been produced which enables mixing and improved subsequent separation of pressure gas saturated water in a stream of produced water so that the salient effect is achieved by the submicron gas bubbles being enveloped by oil drops that are larger than the gas bubbles, so that the most strongest binding possible takes place.

Furthermore, a coalescing and phase separating device has been produced, which uses centrifugal force to increase the drop and bubble size of oil drops and free gas, so that as the mixture enters the traditional separation chamber in cyclones or flotation tanks, the oil/gas is coalesced and separated into large drops/bubbles which can be separated without need for known increased residence time for separation of micro bubbles/drops by usual micro bubble flotation.

A device has been produced for increasing bubble, drop and gas size in a multiphase process water stream, as well as an improvement of the separation of the phases for use as a vortex finder, a cyclone or a flotation cyclone/flotation tank to particularly improve the separation of submicron drops/bubbles/particles in the process water.

The invention is characterized by the device being made up of a coiled tubing shaped as a spiral, through which a liquid stream is processed at an adequate speed for the multiphase separation to happen as a result of the gravitational pull on the phases of different net weight.

The invention is characterized by the injection of gas saturated water into the liquid stream through a spiral shaped coiled tubing, previous to processing, which by vigorous mixing in the liquid stream is pressure reduced, so that the saturated gas in the water is released as gas bubbles, which are enveloped by oil drops.

The invention is further characterized by the processing of polluted water with phases of different net weight where speed and centrifugal force, when processing through the spiral, coalescing submicron and micro gas bubbles enveloped by oil, and oil/other pollutants into large drops before it is lead to the outlet in a cyclone or flotation.

The invention is further characterized by the device, the spiral shaped coiled tubing, being placed in a hydro cyclone or a flotation tank with the added function of vortex finder, by replacing the traditional cylindrical vortex finder in hydro cyclones and flotation tanks.

The invention is further characterized by how the coiled tubing spiral may be coiled clockwise from the bottom up to the outlet and placed as a vortex finder in a hybrid hydro cyclone/flotation tank, so that the stream of light components that are pulled up towards the wall of the vortex finder are twisted upward against the process water stream in the tank and thereby against the reject point over the edge at the top of the vortex finder.

The invention is further characterized by how the device may be placed in or in front of a hydro cyclone /flotation cyclone or in or in front of a flotation tank.

The invention is further characterized by how the device may be used in combination with the dosing of light extraction fluids or flocculants.

The invention is further characterized by a usage of the device in combination with the dosing of hydrocolloid which reacts with mono or multivalent ions as previously known.

According to a preferred execution of a separation and coalescence inducing vortex finder, this may be placed in or in front of a cyclone or in or in front of a vertical cylindrical flotation cyclone/tank, so that the phases of different new weight in the process water are separated and coalesced at centrifugal force, and submicron drops are transformed into larger drops/bubbles/conglomerate which may then be separated in a cyclone or flotation cyclone/tank.

The present invention utilizes in a continuous multiphase stream, where water is one phase, that very small drops of oil/pollutant principally smaller than 5-10 micron, which using known shear mixing technology mixes with gas to envelop submicron gas bubbles and micron gas bubbles smaller than 5-10 micron, and where the gas bubbles are to an adequate degree and extent in themselves smaller than the oil drops, where thereby difference in net weight of oil/gas to water is increased.

In the present invention the different phases of water/liquid/gas bubbles are efficiently separated and coalesced as a result of applied centrifugal force caused by high speed processing through a spiral shaped coiled tubing, wherein the centrifugal force to a considerable degree coalesces gas, gas enveloped by oil drops as well as oil drops, so that both an increase in drop size, gas bubble size and separation of phases has taken place.

Advantages of the Present New Invention.

The present invention distinguishes itself from existing processes/inventions by the enabling of the use of gas saturated water and micro bubble injection in process water streams in order to achieve an improved separation of phases between the different phases in a liquid stream, without this resulting in the residence time in the separation equipment and the dimensioning of the separation equipment having to be increased because the submicron and micron bubbles need a larger separation volume in the separation chamber.

The present invention distinguishes itself from existing processes/invention by the use of gas saturated water and micro bubble gas to remove oil drops/pollution in water which are larger than the gas bubble by having the gas bubble enveloped by pollution, and thereby being bound to pollution stronger than by adhesion. This means specifically that oil drops/pollutants smaller than 5-10 micron can be removed using the present invention, while such pollution cannot be removed using today's technology where larger gas bubbles and adhesion to pollutants has limitations on how small the fractions of pollution can be in order to be removed.

The present invention distinguishes itself from existing processes/inventions by having far more finely dispersed water/gas/oil pre-separated in the vortex finder in a hydro cyclone/flotation cyclone or in a flotation tank into large coalesced drops/conglomerates which are easily separated in the separation chamber.

The present invention distinguishes itself from existing inventions by having far more finely dispersed water/gas/oil pre-separated immediately in front of the vortex finder in a hydro cyclone/flotation cyclone or in a flotation tank to large coalesced drops/conglomerates which are easily separated in the separation chamber.

The present invention distinguishes itself from existing inventions in that submicron and micro bubbles may be embedded in pollution/flocculants /hydrocolloid, and processed through the device, whereby submicron gas, oil and pollutants in the device are brought together at phase separation caused by centrifugal force, so that by the entrance of traditional separation devices the submicron and low micron pollution is already brought to large, easily separable conglomerates. Dimensioning is thereby not required in order to handle separation of micro bubbles.

The present invention distinguishes itself from existing processes/inventions in that the flotation effect of gas enveloped by oil is the salient binding between oil/gas, instead of adhesion, which is common in all flotation processes. The advantage of this is that a much stronger binding between gas/oil is achieved and, as follows, a much tougher flotation and cyclone process may be used without having the gas bubbles torn from the oil drops.

The present invention distinguishes itself from existing processes/inventions in that light extraction fluids may to a larger degree be finely dispersed and better brought in contact with pollution in a process water stream using strong shear forces, as the finely dispersed extraction fluids may be separated in large conglomerates before again entering the separation chamber in the flotation /cyclone.

The device will process the polluted liquid stream into a separation chamber. A gas saturated liquid or micro bubble gas is injected at the front of the device, whereby this is sheared into the polluted liquid stream so that the submicron or micro bubbles are enveloped by pollutants. This gas enveloped by pollution is coalesced in the device, which is preferably constructed as a spiral shaped vortex finder in a cyclone or such in a cylindrical vertical flotation tank, so that net weight difference and/or drop size is significantly increased as the process stream enters the separation chamber, with the purpose that dimensioning of the separation chamber does not increase as a result of the use of submicron or micro bubble introduced into the separation. The device separates different phases in liquid-liquid form of different net weight, liquid-gas and or gas-liquid phases of different net weight, but may also be used for separation of liquid/gas/particles where flocculants or hydrocolloid is used as a separation inducing added agent.

The device according to the invention shall be explained in closer detail in the following description, with reference to the following figures, and wherein the following FIGS. 2-8 is marked with the same numbering for single details:

FIG. 1 Entrance process water (alternatively mixed with flocculent or hydrocolloid).

Figure 2:
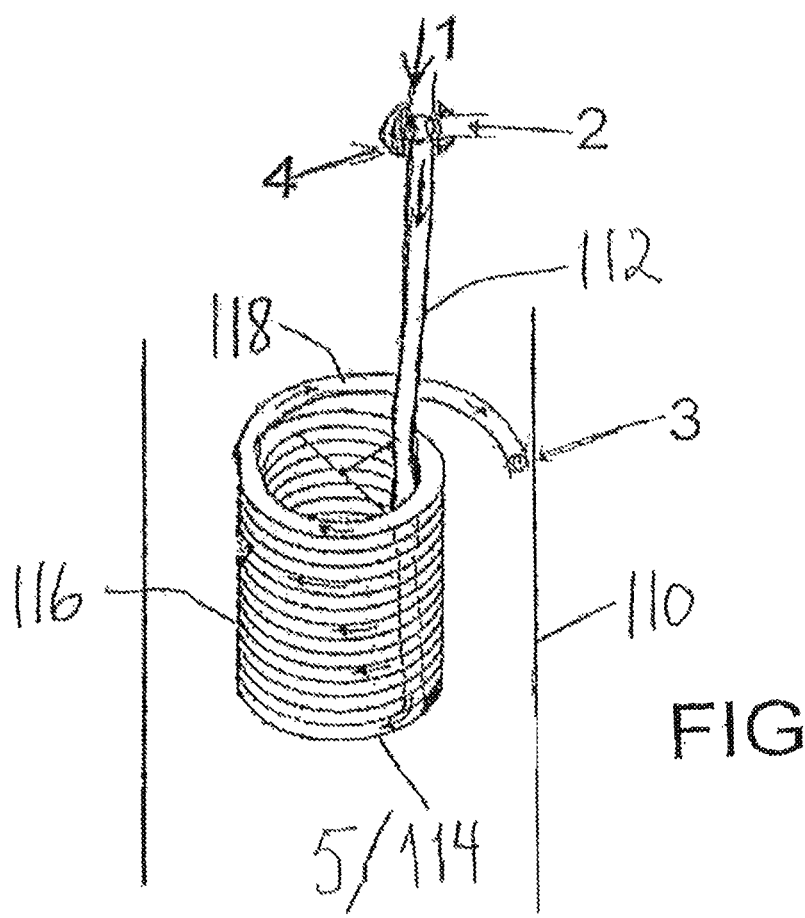

FIG. 2 Injection of pressure gas saturated water/micro bubble gas.

Figure 3:
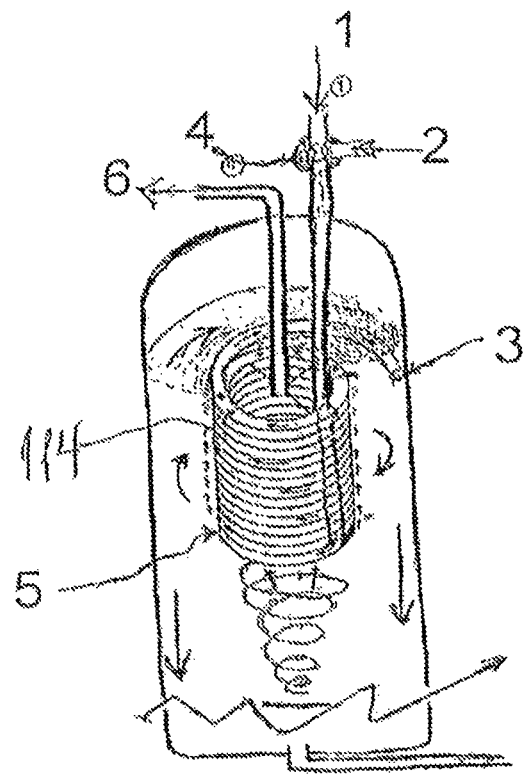

FIG. 3 Outlet of vortex finder in separation chamber.

Figure 4:
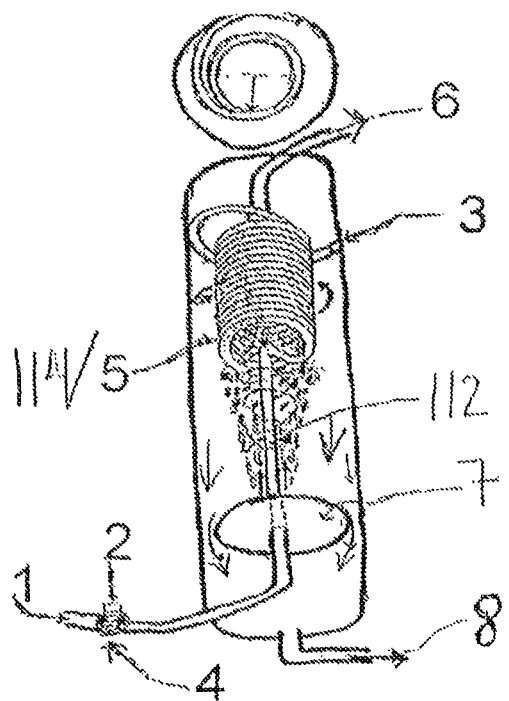

FIG. 4 Shear mixing device for the mixing of gas/process water.

Figure 5:
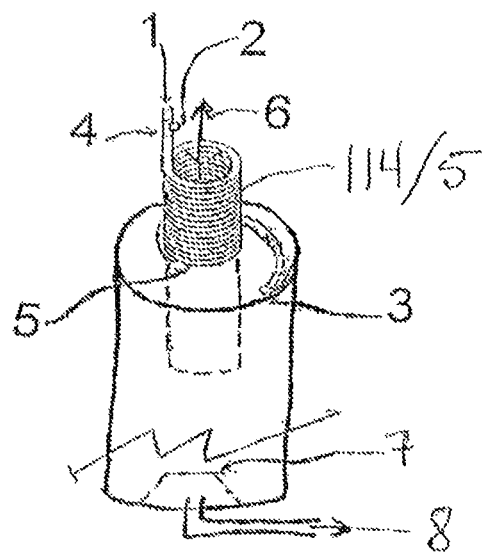

FIG. 5 Vortex finder.

Figure 6:
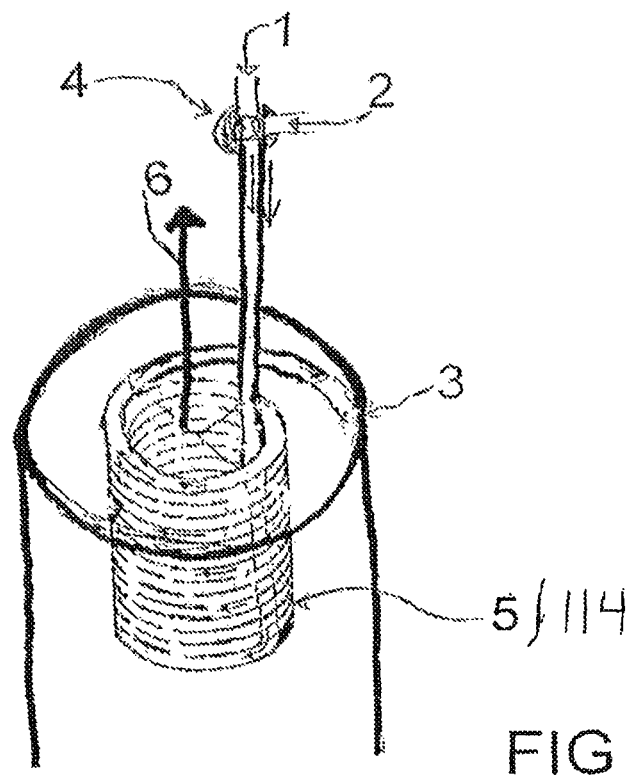

FIG. 6 Outlet separated from gas/light liquid phase from top vortex finder.

Figure 7:
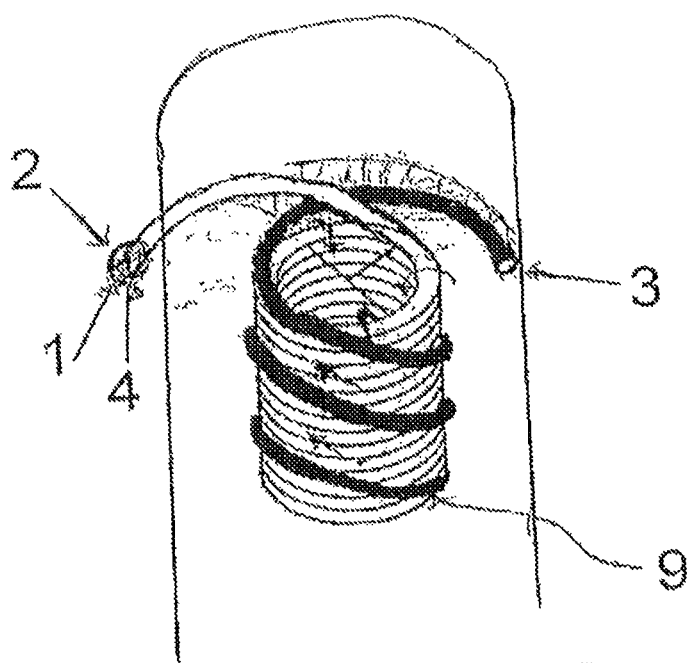

FIG. 7 Standard plate functioning as vortex breaker.

Figure 8:
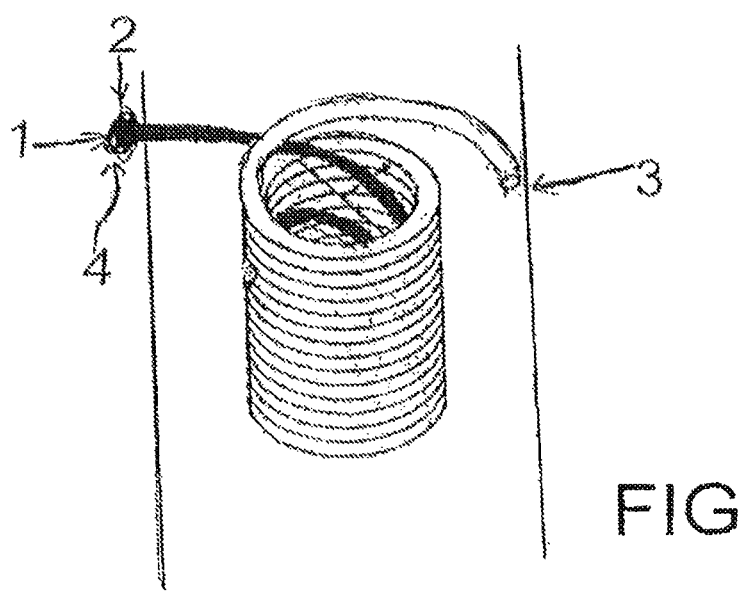

FIG. 8 Outlet clean water

FIG. 1 shows an example of coalescing (after enriching an growth) of drops 102 in a tube spiral 100 when liquid 104 including a certain gas content 106, is processed at high speed through the spiral so that centrifugal forces separate phases/drops of different net weight. The gas drops are gathered in constantly bigger drops during the passage through the spiral 100. The light liquid phase and gas bubbles are pulled toward the centre of the spiral and coalesce, and the heavier liquid phase is pulled by the centrifugal force toward the periphery of the tube 100. The tube inlet is shown at 108, while the discharge outlet is shown at 110, be respective arrows.

FIG. 2 shows (see also FIG. 3) the device according to the invention installed, as vortex finder, in an arbitrary cylindrical separation chamber 110. Multiphase process water enters through pipe 1 where all this may be treated with separation inducing chemicals. Gas pressure saturated water is pressure reduced and/or gas is dosed into the liquid stream 1 in the shear mixing device 4 (a mixing device wherein the water and gas is mixed by high mixing power). Water is led to the bottom of a vortex finder 114 through inlet tube 112, and is then subjected to strong centrifugal forces as it is further processed in the spiral tube 116 which is coiled clockwise upwards to a cylinder shape. At the top of the cylinder (at 118) the coil radius is increased and the tube is simultaneously bent up from the surface of the liquid stream which will occur in the annulus between the cylindrical tank and vortex finder, before the outlet 3 ends in a light downward bend and typically 5-20 cm below the liquid surface in annulus tangentially with the cylinder wall.

In the vortex finder 114 the coalescence and separation process as described in the previous FIG. 1 will take place with the light sub and micro bubble liquid/gas phase compared to heavier water. At the outlet 3 the process water may then be treated as if regular flotation gas had been used with the difference that submicron and micron drops and gas smaller than 10 micron is brought to a size which can normally be removed in known cyclone/flotation processes without an increase in residence time for the process water in the tank/separation chamber.

FIG. 3 shows the device according to the invention installed in a hybrid cyclone/flotation tank which is a vertical separator tank with inlet 1 at the top. Multiphase liquid/gas is mixed and processed through vortex finder 114 as described for FIG. 2 above. Here it is also shown that liquid gas layer in the tank is at the upper edge of the vortex finder 114. There, a lightly compressed air pocket, represented by the tank volume above the vortex finder, is pressure reduced pulsating by pushing a separated light liquid phase and gas through the outlet 6. In annulus outside the vortex finder 5 the water rotates at a very high speed and coalesced larger gas bubbles and oil drops are under the influence of large turbulent forces, so that without the invention oil drops smaller than 5-10 micron would in a standard cyclone flotation be torn from the gas bubbles.

As the coalescing of oil drops prior to the water entering this zone finds the spiral, as well as the envelopment of submicron gas bubbles also in oil drops smaller than 10 micron, the lighter and more coalesced drops do not escape the coalesced gas bubbles as a vortex is created below the vortex finder.

The Figure also shows a standard known vortex breaker 8 above the clean water outlet 7, whose purpose is to prevent short circuit stream of the vortex pillar to outlet. Using gas pressure saturated submicron and micron bubbles in a standard flotation cyclone reduces capacity formidably, as the usual residence time in such tanks is 40 seconds to 1 minute, and this is 2,5-3 times less time than such gas requires to migrate in to the vortex. You will then normally have a short circuit of gas and oil around the vortex breaker 7 and out of the clean water outlet 8. The increase in bubble/drop size, as well as the increased net weight difference of the phases as a result of the present invention means that there is no noticeable reduction in the capacity compared to standard gas flotation with use of submicron and micron gas infusion, and short circuit streams to outlet will not occur with identical accessible tank volume.

The figure also shows a vertical upward stream close to the vortex finder in the ring room. This has been indicated to go over the upper edge and in to the outlet discharge zone of the vortex finder.

This advantage of the vortex finder according to the invention is explained in that in the large circular liquid speed in the ring room a significant amount of oil/gas bubbles will be pulled toward the vortex finder. Having the spiral tube coiled clockwise from below and upward and the high circular liquid stream from below and upward, means that you will see a significant transportation of separated oil/gas upward along the vortex finder caused by screw conveyor effect and the coalescing of the drops on the surface of the vortex finder. Above the edge of the vortex finder, the oil/gas is pulled to the centre of the vortex finder and outlet valve as a result of the rotation speed in the water in the ring room.

FIG. 4 shows the device according to the invention installed in a vertical hybrid cyclone/flotation tank with 1 inlet at the bottom. The function and description is as explained in the explanation of FIG. 3, except the vortex column under the vortex finder rotates around the centered inlet tube 112, and stops in the known vortex breaker 8. This construction also fulfills all the mentioned advantages of the device according to the invention.

FIG. 5 shows the device according to the invention installed in front of a flotation/cyclone/hybrid solution where the standard solution for the vortex finder is an extension with a cylinder form in a traditional vortex chamber. The liquid stream in the device according to the invention goes from the top of the spiral coiled tubing and is led tangentially into the inner side of the outer wall of the vortex chamber.

Previously mentioned advantages of the pre-treatment of drops/gas bubbles are maintained, and outlet gas/light liquid phase is taken out through the vortex finder and further within the circular spiral tube.

FIG. 6

FIG. 6 shows the device according to the invention inside a cyclone or in a standard vortex chamber as a vortex finder.

FIG. 7

FIG. 7 shows the device according to the invention coiled from the top to the bottom of the vortex finder, then coiled clockwise turned with a larger distance and more diagonally upwards in order to lead more coalesced light phase drops/gas upwards and over the edge. This is a typical solution for high concentrations of oil/gas in water.

FIG. 8

FIG. 8 shows the device according to the invention with a side inlet, and an inlet part coiled diagonally into the vortex finder before this, as shown before, is coiled into a cylinder form clockwise and upwards.

EXAMPLE 2000 l water was mixed with raw oil to 200 mg/l. Mixing was done in a shear mixing pump [denoted EDUR EB4u] multi phase pump without mixing in gas. Measurements of the particle size of oil drops showed that 24 ppm of mixed raw oil had a particle size of less than 5 micron.

An attempt was made to remove oil by injecting air bubbles in front of a hybrid cyclone/flotation tank with injection of gas bubbles added in a standard injection mixer. The typical gas bubble size was 50-150 micron. It was processed with oil contaminated process water at an inlet rate of 1 m$^3$/t. Up to 20 ppm oil hydrocarbon was removed from clean water. 16 ppm of the measured residual pollutants had a drop size of less than 10 micron. This test used a compact cyclone/flotation tank with a residence time for process water stream of 40 seconds.

Test 1

The same compact cyclone/flotation unit was then used on the same water and at the same rate but now with an added infusion of gas pressure saturated water produced by the same Edur EB4u multiphase pump where gas was crushed and pressurized to 8 bar in the pump, before it was injected and vigorously mixed with the polluted water in front of the compact cyclone/flotation tank.

It proved to be impossible to remove the fine gas bubbles enveloped by hydrocarbon, and a short circuit stream with gas came out of the unit. Oil hydrocarbon was measured at 64 ppm in clean water. The process rate was reduced to 0.5 m$^3$/t without a successful elimination of short circuit stream of micro bubbles/oil drops in clean water.

Test 2

A spiral shaped tube was installed in the same hybrid cyclone/flotation unit as shown in FIG. 2, and tests were repeated with injections of gas saturated liquid which was vigorously sheared into the process water stream using a static shear mixer, and then processed through the spiral shaped coiled tubing which functioned as a vortex finder in the flotation tank. The result was no short circuit stream of fine gas bubbles/gas-oil in clean water outlet with a processed rate of 1 m3/t. Samples showed less than 1 ppm oil hydrocarbon in outlet and thereby close to complete removal of oil drops smaller than 5-10 micron.

Test 3

A process setup equivalent to test 2 was used on 1000 liter municipal waste water (sewage) with TOC (Total Organic Carbon) of 64 mg/l, where hydrocolloid as biopolymers was reacted with divalent ions to gel flocks with pollution in the process water stream just prior to shearing and infusion of submicron and micro bubble gas (Ref applicant's previous inventions).

Purified effluent had no gas bubbles and was clear. Samples showed that only dissolved carbon remained by 23 mg/l, and analysis showed that the water was approximately 99.9 free suspended solid of SS.

The present invention provides for a large step forward in that fluid may be pre-separated (or in advance) in the helical tube before the phases are let out tangentially into the cyclone chamber, and subjected to further and final phase separation. This means shorter retaining/holding time in the hydro cyclone, and an increased and improved separation of heavy and light fluid phases. Another essential features is that an excellent separation my be achieved without any needs of additives such as chemicals.

The invention claimed is:

1. A method for separation of multiphase fluid of liquid-liquid phase and/or liquid-gas phases and/or gas-liquid phases where one or more of the phases is suspended in water with bubble/drop/particle sizes in the sub micron and micron area and/or fine particular organic or inorganic matter is present in one or more of the phases, comprising the steps of:

placing a device in or in connection to a cyclone having an axis and an outer wall or flotation tank having an axis and an outer wall;

adding said multiphase fluid through the device comprising a tube which forms a spiral shape, in order to bring about an initial phase separation by coalescing in the spiral shaped tube; and releasing the phases continuously tangentially out of the spiral tube in said cyclone—or flotation tank wherein further separation is generated, locating the spiral shaped tube in at least a part within the cyclone or flotation tank said vortex finder formed from said spiral tube is spaced from the outer wall of the cyclone or flotation tank and defines an annular region outside said vortex finder and inside the outer wall of the cyclone or flotation tank and is centered on the axis of the cyclone or flotation tank and said spiral tube forms a vortex finder of the cyclone or flotation tank, and forms a tangential fluid phase outlet on the inside of the outer wall of the cyclone or flotation tank.

2. The method according to claim 1, wherein the multiphase fluid are added to the spiral tube at such speed that the centrifugal force produces adequate coalescing, drop growth, gas bubble growth and separation of phases of different net weight.

3. The method according to claim 1, wherein the multiphase fluid is led through the spiral tubing which forms an integrated vortex finder in said cyclone or flotation tank wherein the entrance to the device is selected from the group consisting of a bottom, a top or a side of the cyclone or flotation tank.

4. The method according to claim 1, wherein the spiral tube forms a vortex finder and the spiral is in the direction from a bottom up clockwise of the device and the multiphase fluid is released tangentially clockwise in a cylindrical chamber of said cyclone or flotation tank.

5. The method according to claim 1, wherein the spiral tube forms a vortex finder having a from below and upward anticlockwise coiled spin, and wherein said tangentially anticlockwise on the inside of the outer wall in said cyclone or flotation tank.

6. The method according to claim 1 for separation of phases and coalescing of oil and hydrocarbon and gas bubbles in a produced water stream from oil and gas production from a reservoir as separation for separation in or before said cyclone or flotation tank further comprising the step of injecting a mixture of gas pressure saturated water/gas into the produced water stream which is sheared so that this shearing turns a significant share of oil drops smaller than 10 micron into envelopment of gas bubbles, whereby these are separated from produced water in the device.

7. The method according to claim 1, wherein said multiphase fluid is a produced process water stream containing oil and comprising the step of coalescing submicron and micron gas bubbles injected into said produced process water stream and coalescing of oil hydrocarbon enveloping gas smaller than 10 micron in said produced process water stream from oil and gas production from reservoir.

8. The method according to claim 1, wherein said multiphase fluid is a produced process water stream containing oil and further comprising the step of coalescing oil hydrocarbon and gas bubbles smaller than 10 micron in said produced processed water stream from oil and gas production from reservoir used as separation previous to said cyclone or flotation tank.

9. The method according to claim 1, for the separation of multiphase fluid and coalescing of gas, organic and inorganic particular pollution in a continuous water stream as separation for separation in or before said cyclone or flotation tank further comprising the step of injecting into the continuous stream a flocculent or reacted hydrocolloid and also injecting and shearing a mixture of gas pressure saturated water/gas into the water stream so that this shear mixing brings about a significant share of gas to everything from submicron flocks to large flocks, whereby these are separated from the water phase in the device.

10. The method according to claim 1 wherein in the placing step, the device is an independent vortex finder in a cyclone or flotation tank.

11. The method according to claim 1 wherein in the placing step, the device is arranged in combination with a normal vortex finder of said cyclone or flotation tank, in that the device is a spiral vortex finder arranged above a liquid level of said cyclone or flotation tank.

12. An apparatus for the separated of multi phase fluid of liquid-liquid phase and/or liquid-gas phases and/or gas-liquid phases where one or more of the phases is suspended in water with bubbles/drop/particle sizes in the sub micron and micron area and/or fine particular organic or inorganic matter is present in one or more of the phases, comprising a device integrated in a cyclone having an axis and an outer wall or flotation tank having an axis and an outer wall, the device comprising a tube which forms a spiral shape and through which the multiphase fluid stream in order to bring about a preliminary separation by coalescing the spiral tube comprises an inlet and an outlet for the multiphase fluid, the outlet of the spiral tube is placed tangentially in said cyclone or flotation tank wherein additional separation is generated; and wherein the spiral tube is located in at least a part within the cyclone or flotation tank and is centered on the axis of the cyclone or flotation tank and forms a vortex finder of the cyclone or flotation tank said vortex finder formed from said spiral tube is spaced from the outer wall of the cyclone or flotation tank and defines an annular region outside said vortex finder and inside the outer wall of the cyclone or flotation tank and said spiral tube forms a tangential fluid phase outlet on the inside of the outer wall of the cyclone or flotation tank.

13. The apparatus according to claim 12, wherein the spiral tube has a lead angle so that the spiral forms a sideways tight sheath.

14. The apparatus according to claim 12, wherein the cyclone or flotation tank has a cylindrical outer wall.

15. The apparatus according to claim 12, wherein the inlet of the spiral tube is in a location consisting of at a bottom, a top, and a side of the cyclone or flotation tank.

16. The apparatus according to claim 12, wherein a coiling of said spiral tube is clockwise from a spiral tube bottom upwards so that in use, the multiphase fluid is released tangentially clockwise in said cyclone or said flotation tank.

17. The apparatus according to claim 12, wherein the spiral tube creates a vortex finder having an anti-clockwise coil from a spiral tube bottom up, and wherein the spiral tube outlet in the cyclone or flotation tank is tangentially anti-clockwise on the inside of the outer wall in said cyclone or flotation tank.

18. The apparatus according to claim 12, wherein the spiral tube initially goes downward but is then made to go upward in a coaxial coil.

* * * * *